Patented June 15, 1954

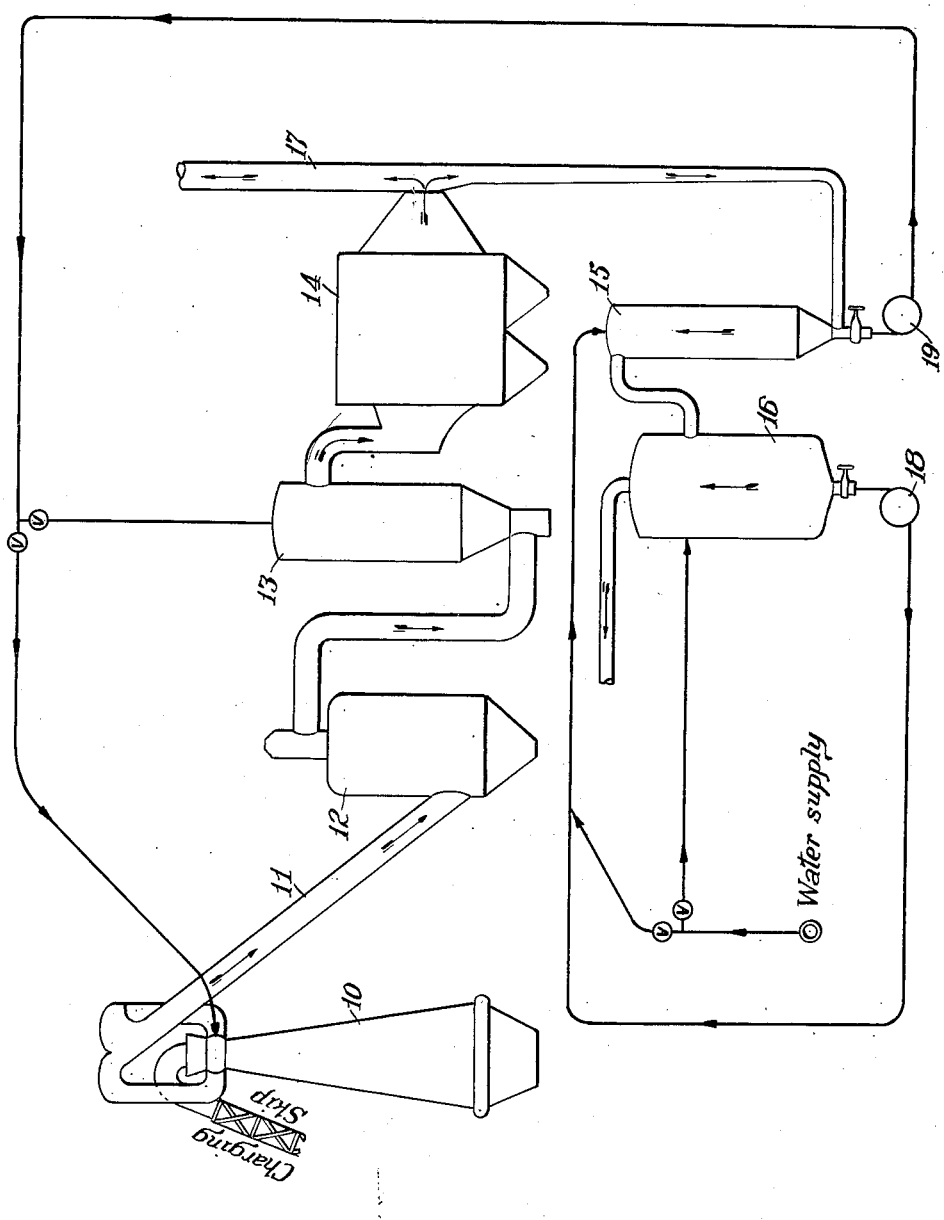

2,681,121

UNITED STATES PATENT OFFICE 2,681,121

RECOVERY OF SUSPENDED MATERIALS FROM GASES

Harry L. Richardson, Bound Brook, N. J., assignor to Research Corporation, New York, N. Y., a corporation of New York Application June 29, 1951, Serial No. 234,367

7 Claims. (Cl. 183—7)

This invention relates to the recovery of suspended materials from gases and particularly a method and apparatus for the recovery in dry form of water-soluble materials in suspension in gases. The invention is particularly useful in preventing noxious water-soluble materials suspended in gases from escaping in waste water from processes for removing suspended materials from the gases, for example, by electrical precipitation wherein the gases are treated with water to condition them for the electrical precipitation.

The invention will be particularly described with reference to the cleaning of gases from ferro-manganese blast furnaces. Such gases typically contain water-soluble cyanides in suspension. An effective method of treating such gases is to humidify and partially cool the hot gases by the addition of water, pass the humidified gases through a dry electrical precipitator, further saturate the gases with water, for example, in a spray tower, and thereafter pass the gases through a wet type electrical precipitator in which the collecting electrodes are flushed with water. Water contaminated with soluble cyanides may come from drip from the humidifying tower ahead of the dry precipitator, from the saturating tower between the dry and the wet precipitator and from the flushing water from the wet precipitator. It has been found that by returning water from these points to the hot gases ahead of the dry precipitator, the soluble materials derived from the gases may be recovered in dry form. In this way noxious substances are prevented from polluting adjacent springs, wells or streams and in some cases substances of value may be recovered in useful form.

The accompanying drawing shows in semi-diagrammatic form a system of apparatus embodying the principles of the invention particularly adapted for the cleaning of ferro-manganese furnace gases.

In the drawing 10 is a blast furnace having a gas off-take pipe 11. The gas is passed through a dry dust catcher 12, which may be a centrifugal type dust separator, then to a conditioning tower 13 in which the gas is humidified and partially cooled by water sprays, and from the tower 13 to a dry type electrical precipitator 14. As shown in the drawing, such portion of the gas as is needed for the hot blast stoves is passed successively through a saturating tower 15 and a wet type electrical precipitator 16, wherein it is further purified and issues in condition for use in heating the stoves.

The portion of the gases not needed for the stoves is passed through stack 17 to be burned under steam boilers or for other uses not requiring finely cleaned gas.

The wet precipitator 16 is supplied with fresh water for flushing the electrodes. The drainage from the sump of precipitator 16 is pumped by pump 18 to the saturating tower, additional fresh water from the water supply being added as required. The aqueous solution from the saturator, containing in solution soluble material washed out in the saturator as well as that collected in the wet precipitator, is pumped by pump 19 to the humidifier 13 and to the top of the furnace or hot gas pipe 11, wherein it is evaporated in cooling the hot gases to a temperature at which damage to the furnace top is eliminated. In this manner any soluble matter picked up by the water in the saturator and the wet precipitator is eventually recovered in dry solid form in the dust catcher 12 or the dry precipitator 14. If conditions warrant, any drip which may collect in the bottom of humidifier 13 may be returned to the top of the humidifier or to the hot gas pipe 11 by means of a pump and pipe line, not shown in the drawing.

In a typical illustrative embodiment of the method of the invention the normal gas flow at the top of the ferro-manganese furnace is 50,000 ft. 3/min. of dry gas at standard conditions to which 3180 gal./hr. of water from saturator 15 are added at the furnace top to reduce the temperature to 700° F. A further 2350 gal./hr. of water are added to the gas in humidifier 13 to bring the gas temperature down to 350° F. at the inlet to the dry precipitator. 30% of the gas coming from the dry precipitator is needed for the stoves and must be further cleaned. Therefore, 15,000 ft./min. (standard conditions) of gas from the dry precipitator are passed through the saturating tower 15 and wet precipitator 16 for this purpose. 4275 gal./hr. of fresh water are supplied to the wet precipitator for flushing the electrodes and the drainage from the precipitator is supplied to the saturator. The temperature of the gas entering the wet precipitator is about 120° F. saturated, when water at about 70° F. is available, which is reduced to about 90° F. saturated in passing through the wet precipitator. The effective heat content of the gas is increased in the saturator and the wet precipitator by the condensation of a substantial portion of the water content of the gas coming from the dry precipitator. Typically, under the conditions indicated above, about 1005 gal./hr. of water will be condensed out of the gases providing about 6030 gal./hr. of drainage from the saturator to be evaporated in the hot gases prior to passing to the dry precipitator.

It will be apparent that the principles of the invention are applicable to the recovery in dry form of any water-soluble noxious or valuable substance suspended in hot gases and that generally the invention comprises subjecting a hot gas containing water-soluble suspended material successively to partial separation of suspended material, saturation by direct contact with excess water and further separation of suspended material, the liquid from at least one of the last two operations being evaporated into the hot gas in the partial humidification operation.

It will further be evident that numerous modifications may be made in the method and apparatus described by way of example without departing from the principles of the invention. The use of a dry dust catcher as shown at 12 of the drawing is not essential. The water from the final separation operation, illustrated in the drawing by wet precipitator 16 may be supplied directly to the hot gases ahead of the dry separation, and the saturation and final separation operation may be combined in a single operation.

The term "dry precipitation" employed in the specification and claims refers to the collection of fume or dry particles from gas streams in a dry state. Precipitators in which the precipitate is collected in this dry state are referred to as dry precipitators.

Similarly the term "wet precipitation" refers to the collection of liquids, semi-liquids, pastes, and sludges. These free-flowing materials may originate from the precipitation of liquid mist particles such as tars and acids or from dry fume or dry particles which have been precipitated into films or liquids running down the electrodes. The films or liquids may be supplied by auxiliary means such as sprays or by weir means from pools of liquids adjacent the tops of the collecting electrodes. Precipitators in which the precipitate exists in the liquid or semi-liquid state are termed "wet precipitators."

I claim:

1. A method of recovering water-soluble materials suspended in hot gases which comprises subjecting the gas to partial humidification, separating a portion of the suspended material from the gas in a dry state, subjecting the gases to direct contact with water to remove residual suspended water-soluble particles in the form of an aqueous solution thereof and supplying the aqueous solution thereby obtained to said hot gases to effect at least a part of the humidification thereof.

2. A method of recovering water-soluble materials suspended in hot gases which comprises subjecting the gas to partial humidification, separating a portion of the suspended material from the gas in a dry state, subjecting the gas to direct contact with water in the presence of an electrical precipitating field to remove residual suspended water-soluble particles in the form of an aqueous solution thereof and supplying the aqueous solution thereby obtained to said hot gases to effect at least a part of the humidification thereof.

3. A method of recovering water-soluble materials suspended in hot gases which comprises subjecting the gas to partial humidification, electrically precipitating a portion of the suspended material from the gas in a dry state, subjecting the gases to direct contact with water to remove residual suspended water-soluble particles in the form of an aqueous solution thereof and supplying the aqueous solution thereby obtained to said hot gases to effect at least a part of the humidification thereof.

4. A method of recovering water-soluble materials suspended in hot gases which comprises subjecting the gas to partial humidification, electrically precipitating a portion of the suspended material from the gas in a dry state, subjecting the gases to direct contact with water in the presence of an electrical precipitating field to remove residual suspended water-soluble particles in the form of an aqueous solution thereof and supplying the aqueous solution thereby obtained to said hot gases to effect at least a part of the humidification thereof.

5. Apparatus for recovering in a dry state water-soluble materials suspended in hot gases from metallurgical furnaces, comprising a dry electrical precipitator for separating suspended material from the gases in a dry state and a wet electrical precipitator for separating residual suspended material from the gases in an aqueous solution, flue means for passing the gases successively through the dry electrical precipitator and the wet electrical precipitator and conduit means for conveying aqueous solution from the wet precipitator to said hot gases upstream of the dry precipitator to humidify the gases and convert the dissolved material into dry form.

6. Apparatus for recovering in a dry state water-soluble materials suspended in hot gases from metallurgical furnaces comprising a humidifier for reducing the temperature and increasing the moisture content of the gas, a dry electrical precipitator for separating suspended material in a dry state, a gas washer for saturating the gases, a water-flushed wet electrical precipitator, flue means for passing the gases successively through said humidifier, dry electrical precipitator, gas washer and water-flushed wet electrical precipitator, conduit means for supplying water to said wet electrical precipitator and said gas washer, conduit means for conveying aqueous solution of said water-soluble suspended materials from said wet precipitator to said gas washer and conduit means for conveying aqueous solution of said water-soluble suspended material from said gas washer to said humidifier.

7. Apparatus for recovering in a dry state water-soluble materials suspended in hot gases from metallurgical furnaces comprising a humidifier for reducing the temperature and increasing the moisture content of the gas, a dry electrical precipitator for separating suspended material in a dry state, a gas washer for saturating the gases, a waterflushed wet electrical precipitator, flue means for passing the gases successively through said humidifier, dry electrical precipitator, gas washer and water-flushed wet electrical precipitator, conduit means for supplying water to said wet electrical precipitator and said gas washer, conduit means for conveying aqueous solution of said water-soluble suspended materials from said wet precipitator to said gas washer and conduit means for conveying aqueous solution of said water-soluble suspended material from said gas washer to said flue means between said furnace and said humidifier.

References Cited in the file of this patent

UNITED STATES PATENTS

| Number | Name | Date |
| --- | --- | --- |
| 1,338,271 | Welch | Apr. 27, 1920 |
| 1,444,627 | Meston | Feb. 6, 1923 |
| 2,055,368 | Shively | Sept. 22, 1936 |
| 2,056,789 | Irwin et al. | Oct. 6, 1936 |
| 2,273,194 | Hedberg et al. | Feb. 17, 1942 |
| 2,368,828 | Hanson et al. | Feb. 6, 1945 |

FOREIGN PATENTS

| Number | Country | Date |
| --- | --- | --- |
| 654,350 | Great Britain | June 13, 1951 |